Nov. 22, 1966  H. J. KIMMERLE  3,287,068
ARTICLE HANDLING PUMP
Filed May 26, 1965  3 Sheets-Sheet 1

INVENTOR.
HOWARD J. KIMMERLE
BY Huebner & Worrel
ATTORNEYS

Nov. 22, 1966 H. J. KIMMERLE 3,287,068
ARTICLE HANDLING PUMP
Filed May 26, 1965 3 Sheets-Sheet 2
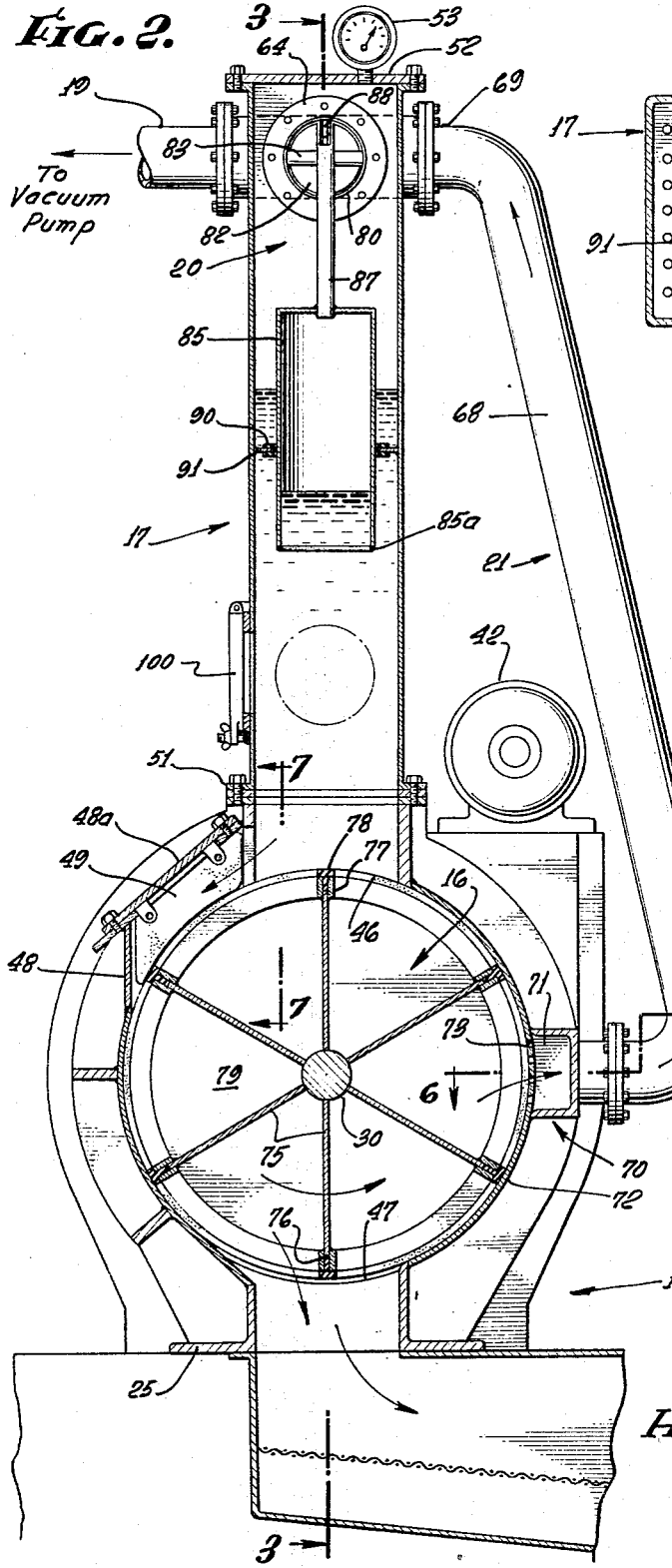
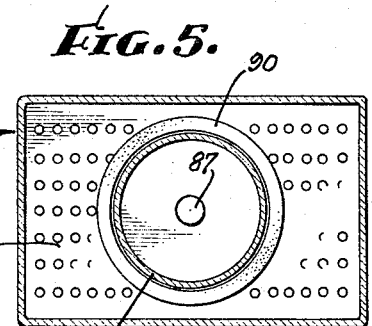
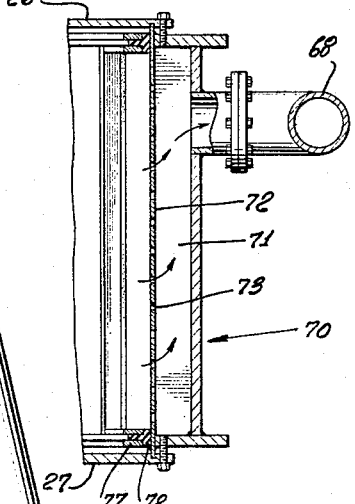
INVENTOR.
HOWARD J. KIMMERLE
By Huebner & Worrel
ATTORNEYS.

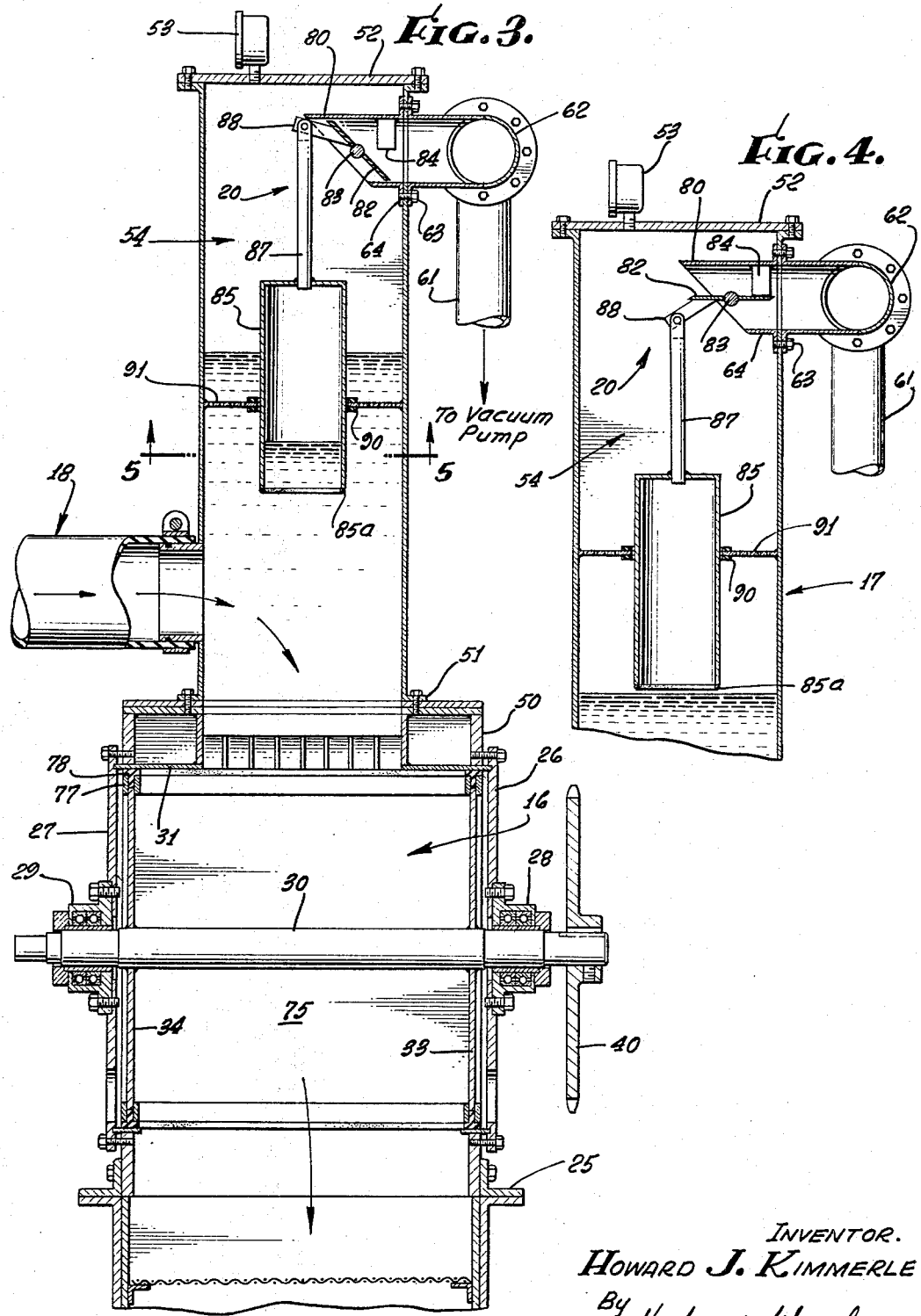

United States Patent Office 3,287,068
Patented Nov. 22, 1966

3,287,068
ARTICLE HANDLING PUMP
Howard J. Kimmerle, Long Beach, Calif., assignor to Harbor Boat Building Co., Terminal Island, Calif., a corporation of California
Filed May 26, 1965, Ser. No. 459,008
13 Claims. (Cl. 302—14)

This invention relates to material conveying apparatus and in particular to a vacuum operated pump for handling fish and other tender goods as for example tomatoes, apples, potatoes, pickles, etc., without damage.

An example of its use is to lift fish from hardened nets for delivery to the vessel's hold, or at the dock to unload fish from the hold of the boat to a belt conveyor or other receiving facility.

It is an improvement over previously known apparatus designed for the same purposes, has fewer moving parts and is more sensitive in its response to and control of operating conditions.

In its essentials, the apparatus comprises a surge tank, a material conveying suction conduit leading from any desired source exposed to atmospheric pressure to the lower section of the surge tank, a metering delivery valve in the form of a vaned rotor working in a cylinder below the surge tank, a primary vacuum line connected with the upper portion of the surge tank having a secondary line leading from the tank to the rotor housing, and an automatic valve system in the vacuum line controlling suction in the surge tank and actuated by the level of material or liquid in the surge tank which, in turn, is dependent upon the acceptance capacity of the metering delivery valve.

In most installations the fish or other material to be pumped will be suspended or submerged in water or other liquid, but the pump can be operated without water on moist fish or on any other product that can be pulled by vacuum. Most products, however, need the water or liquid carrier to make the pump suction more effective and eliminate or minimize abrasion of the products.

The primary object of the invention is to provide an apparatus of the character described with an automatic control in the vacuum line itself responsive to the operating conditions in the receiving and discharging sections of the pump.

A more particular object is to provide such an automatic control in the form of a valve in the primary vacuum line adjacent its communication with the surge tank, and a float with linkage for opening or closing the valve.

These and other objects of the invention will become more apparent from the description which follows taken in conjunction with the drawings.

In the drawings:

FIGURE 2 is a vertical section of the pump mechanism viewed in the same direction as FIGURE 1.

FIGURE 3 is a vertical section taken on the line 3—3 of FIGURE 2. In this figure the automatic vacuum valve system is fully closed.

FIGURE 4 is a fractional vertical section comparable to the upper portion of FIGURE 3, showing the same valve system in the full open position.

FIGURE 5 is a horizontal section taken on the line 5—5 of FIGURE 3.

FIGURE 6 is a horizontal section taken on the line 6—6 of FIGURE 2.

Figure 1:
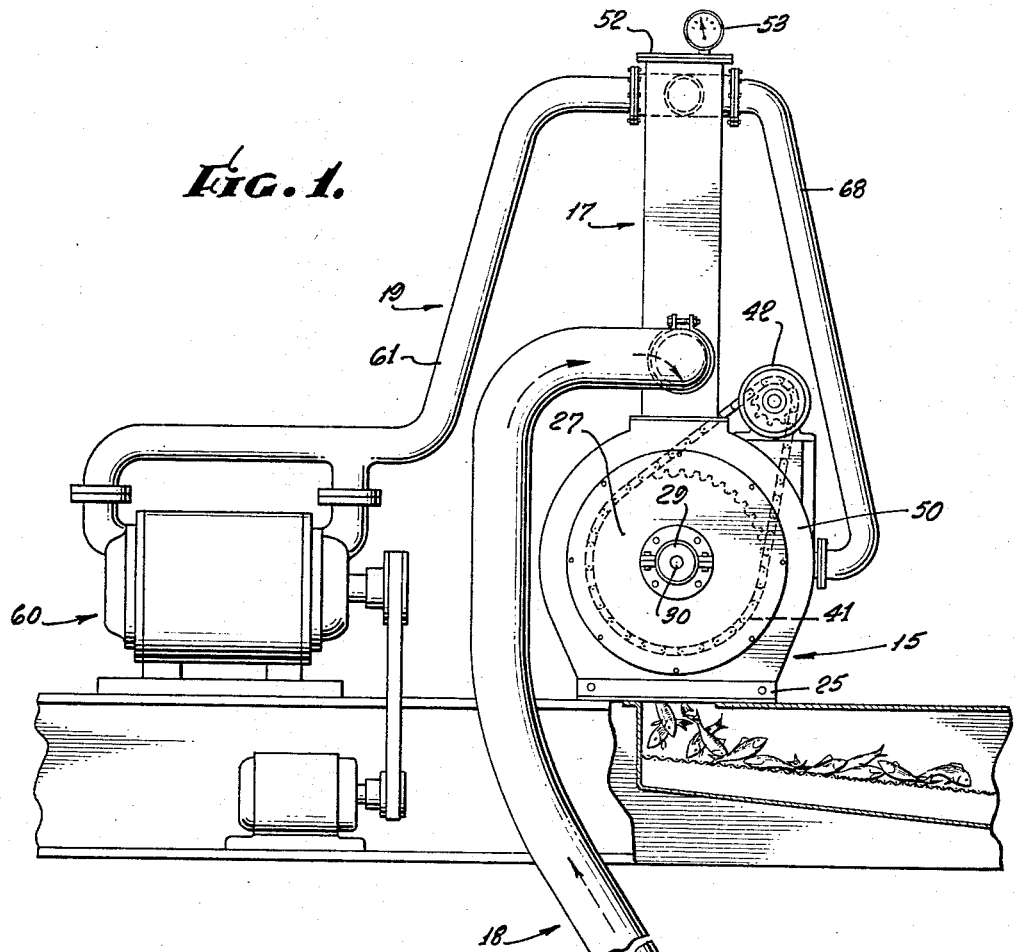
FIGURE 1 is an elevational view of the pump assembly.
Figure 7:
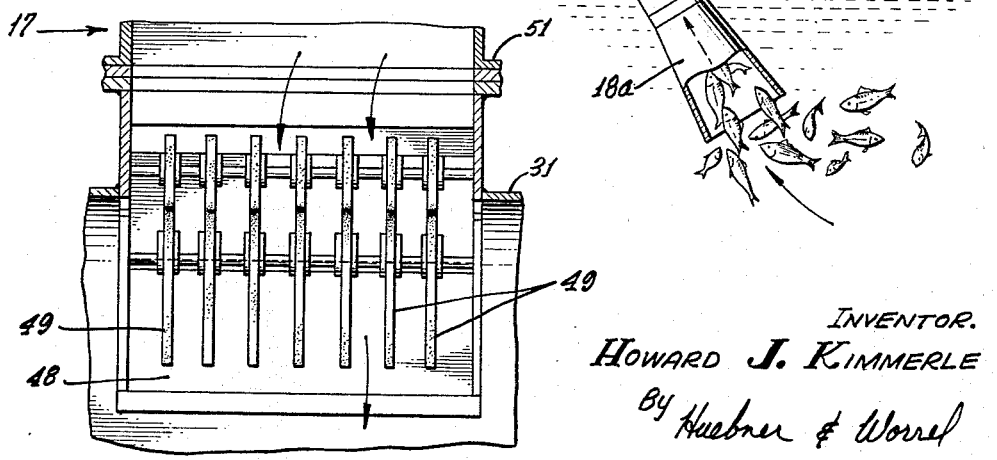
FIGURE 7 is a vertical section taken on the line 7—7 of FIGURE 2.

By way of preliminary summary, the apparatus includes a base housing 15, containing a metering delivery valve in the form of a sectored rotor 16, a surge tank 17 supported on the housing above the valve 16, suction intake conduit 18, a primary vacuum line 19 connected in the upper section of the surge tank, an automatic vacuum control valve system 20, and a secondary vacuum line 21 running from the primary line to the metering delivery valve 16.

The base housing 15 is in the general shape of a horizontal barrel with suitable mounting flanges 25, and being closed at the ends by plates 26 and 27. These plates support journals 28 and 29 for a shaft 30. A cylinder 31 is supported between the plates 26 and 27.

Circular discs 33 and 34 which are welded to the shaft, constitute end walls of the metering delivery valve 16, the latter for brevity being usually referred to hereinafter as a rotor.

Outside the housing, the shaft 30 may have keyed thereto a large sprocket 40, to be driven at reduced speed through a chain 41 from a motor 42.

The cylinder 31 is formed with an inlet opening 46 at the top generally coextensive in area with the open bottom of the tank 17 and an outlet opening 47 at the bottom.

Also, the cylinder may include an enlargement 48, covered by a plate 48a which mounts a plurality of dividers 49 made of rubber or other relatively soft flexible material to aid in channelling the fish or other products as they emerge from the surge tank, and prevent them from becoming caught between the rotor and the edge of the cylinder opening 46.

The surge tank 17 may be mounted on a superstructure 50 of the housing 15 as by bolted flanges 51.

This tank (or surge tower) may be rectangular in cross section, and is sealed at the top by a cap 52. A pressure gage 53 may be tapped into the cap. The surge tank furnishes a closed area 54 in which the vacuum may be pulled and which is the primary storage of sub-atmospheric pressure. The tank should be of sufficient volume to also function as a reservoir for incoming fish or other product preliminary to delivery through the rotor 16.

The primary vacuum line 19, includes a vacuum pump 60 with a pipe 61 connected to the surge tank through a T joint 62 held by cap screws 63 threaded into a flange 64 which is part of the control valve system 20.

In this specification, use of the terms vacuum or vacuum pump are in the ordinarily accepted sense of creating a subatmospheric pressure by an air pump or any conventional type of vacuum producing device (not an absolute vacuum in a technical sense). As an example, and not a limitation, it has been found that a pump with a capacity of approximately 1000 c.f.m. operates satisfactorily in conjunction with an intake conduit of approximately 8 inches diameter.

The secondary vacuum line 21 includes a pipe 68 coupled at its upper end to the T joint 62 as at 69, and to the interior of the cylinder 31 through a manifold 70.

This manifold is in the form of an elongated box 71 welded to the wall 72 of the cylinder, which latter is formed with perforations 73 distributed throughout the area defined by the box.

The rotor 16 includes vanes 75 welded on the shaft 30, extending between and welded to the discs 33 and 34, and having peripheral straight edges 76. These edges carry resilient pads 77 which intersect annular resilient rings 78 on the discs 33 and 34 and jointly wipe against the cylinder wall to provide a seal therewith generally impervious to air, whereby each sector 79 of the rotor is generally isolated hermetically from the atmosphere except when in dumping position.

The control valve system 20 which contributes an important feature of novelty, comprises a nipple 80 extending from the flange 64 into the closed area 54, and is in effect a continuation of the T joint 62.

A butterfly valve member 82 is positioned in the nipple by a freely pivoted mounting 83 in the wall of the nipple, and is movable to close off or open the passage provided by the nipple. A stop 84 depending from the top of the nipple limits the opening travel of the valve member to full open.

Movement of the butterfly valve member is in response to vertical movement of a float 85 which is shown in the form of a can closed at the top and open at the bottom. The can is surmounted by a stem 87, at the upper end of which a linkage 88 connects it to the upper half of the valve member 82. When the float rises the valve moves closed (see FIGURE 3), when the float drops the valve moves open (see FIGURE 4). A ring 85a of rubber or other relatively soft resilient material lines the lower edge of the can to prevent chafing of fish or other products which may brush against it.

The float 85 is vertically confined within and guided by an annular ring 90, preferably rubber or other relatively soft resilient material, which is mounted in a rigid perforated plate 91 welded or otherwise secured on the walls of the tank 17. The plate 91 offers a barrier to fish or other products, although permitting air and water to pass therethrough.

Optionally an inspection window 100 may be included, and this can be opened if necessary for access in case of congestion in the tank not otherwise, cleared up.

The operation will be described in conjunction with transfer of fish accumulated in a body of water.

The intake conduit 18 is disposed with its free end 18a below the surface of the water, and the vacuum pump 60 is started. This generates a sub-atmospheric pressure in the pipe 61. At the start, the surge tank 17 is empty or the water level low, and the float 85 is at its lowest position (see FIGURE 4), whereby the butterfly valve member 82 is wide open, being stopped in that position against the stop 84. This results in vacuum being established in the surge tank.

Atmospheric pressure causes water laden with fish to be sucked up through the intake conduit 18 and delivered into the surge tank 17.

Meanwhile, the motor 42 is started and the rotor 16 revolves at a predetermined relatively slow speed, as for example, but not of limitation, 21 r.p.m. more or less. A standard variable speed control, not shown, may be employed.

Part of the vacuum pull is carried through the secondary line 21, manifold 70 and perforations 73 of the cylinder 31 to a sector of the rotor 16, while the latter is passing the perforation zone, which exhausts the air from that sector as the rotor revolves, and the evacuated sector reaches the opening 46 with a subatmospheric pressure, which momentarily supplements the vacuum action in the surge tank, and facilitates deposit of fish and water in this sector, whereupon they are carried on around and down for discharge through the outlet opening 47.

Fish and water may build up in the surge tank faster than the successively presented sectors of the rotor can accept and deliver them to discharge. When this occurs above a predetermined elevation in the surge tank, the maximum build up of fish being governed by the plate 91, the float 85 will rise under action of water or fish or both and move the butterfly valve member toward closed position, reducing or cutting off from the area 54 the suction of the vacuum line 19. This slows or temporarily stops the intake of fish and water, until the discharge through the rotor clears the excessive accumulation in the surge tank, whereupon downward movement of the float opens the butterfly valve to restore the suction. If water only rises against the float it will ordinarily accept a quantity of water through the open end before it begins to rise.

The secondary vacuum line 21 always remains open and effective to facilitate disposal of the fish through the rotor.

The means described for the regulation and control of fish or other product intake as related to discharge is sensitive and efficient beyond any previously known systems. The area 54 is subjected continuously to either full or reduced vacuum pull or a substantially complete discontinuance thereof. A good balance of action is obtained resulting most of the time in a mere slowing down or speeding up when conditions require, as opposed to a complete stoppage, of the intake flow.

Fish accumulated for pumping may occupy more volume than the water in which they are submerged, or may be merely moist with no free water clearly discernible. In such cases the pump operates in the same manner as already described except that fish rather than water will actuate the float 85 for upward movement when excessive accumulation occurs in the tank 17.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures and apparatus.

What I claim as new and desire to secure by Letters Patent is:

1. An apparatus for raising and conveying articles disposed under the influence of ambient atmosphere comprising means forming a substantially hermetically closed chamber, an article intake conduit having an open end for engagement with the articles and communicating with the chamber, a rotary discharge mechanism associated with the chamber and embodying sectors substantially hermetically sealed with the chamber when a sector is in article receiving position, means including a pump and a line to pull a vacuum in said chamber whereby atmospheric pressure will cause a flow of articles through the intake conduit into the chamber and thence by gravity into the sector which is in article receiving position, and control means to open, shut off, or regulate the vacuum pull exerted in the chamber, said control means comprising a valve in the line, a vertically movable member in the chamber actuatable in one direction by excessive accumulation of articles or a liquid carrier thereof in the chamber and in the other direction by gravity, and a linkage between the member and the valve.

2. An apparatus as defined in claim 1 which includes a constantly open vacuum line between the chamber and a sector approaching the article receiving position, said line including a manifold distributing a vacuum pull along substantially the entire length of the last named sector to establish a vacuum in the sector.

3. An apparatus as defined in claim 1 in which the line pulling the vacuum in the chamber embodies a terminal within the chamber, and the valve is disposed in said terminal.

4. An apparatus as defined in claim 3 in which the valve is a butterfly pivoted in the terminal, and a stop is mounted in the terminal to obstruct the butterfly at the full open position.

5. An apparatus as defined in claim 1 in which the vertically movable member in the chamber is a cylindrical open bottom can.

6. An apparatus as defined in claim 5 in which a barrier is mounted in the chamber and which is pervious to the passage of air and water, but prevents upward passage of articles being conveyed, and a guide is mounted in the barrier to circumscribe the can.

7. In an apparatus for lifting and conveying articles in liquid as a vehicle, means forming a closed reservoir, an intake conduit communicating with the reservoir, means to create sub-atmospheric pressure in said reservoir to cause a flow thereinto of article laden liquid when the intake conduit is submerged in article laden liquid exposed to the atmosphere, a metering discharge means below the reservoir to receive and discharge article laden liquid flowed into the reservoir, and means to maintain a generally balanced introduction of articles into the reservoir and discharge therefrom comprising a valve control system connected directly into the means to create the sub-atmospheric pressure, said system including an actuating element responding to the elevation of article laden liquid in the reservoir, the means to create sub-atmospheric pressure including a vacuum line having an extension terminating within the reservoir, the valve control system including a valve in the extension, and a linkage between the valve and the actuating element, whereby the elevation of the actuating element as determined by the height of article laden liquid in the reservoir governs the opening or closing of the valve and consequently the degree of vacuum pull in effect in the reservoir.

8. A combination as defined in claim 7 wherein the actuating member is an open bottom can wherein liquid may rise to a predetermined extent before the can will start to rise.

9. A combination as defined in claim 8 wherein a liquid pervious member is mounted in the reservoir serving as a barrier to articles, and a guide encircling the can is carried by the member.

10. A fish pump comprising a closed tank, a fish conduit having one end for receiving fish subject to the influence of ambient atmosphere and the other end communicating with the tank, a discharge mechanism below the tank to receive fish from the tank and deposit them in a discharge area, vacuum means to produce sub-atmospheric pressure in the tank to cause flow of fish thereinto through the conduit, the vacuum means including a line with a terminal inside the tank, and control mechanism operatively associated with the vacuum means to regulate the degree of the negative pressure in the tank and consequently the inflow of fish, said control mechanism including a valve member to open or close the terminal, an actuating element movable in response to the volume of fish or a liquid carrier thereof accumulated in the tank, and a linkage between the actuating element and the valve member.

11. A fish pump as defined in claim 10 in which the actuating element is a float.

12. A fish pump as defined in claim 10 in which the valve member is a butterfly pivotally mounted in the terminal.

13. In an apparatus for lifting and conveying flowable materials, means forming a closed reservoir, an intake conduit communicating with said reservoir, means including a continuously operating single vacuum line having a first branch communicating with the reservoir to create sub-atmospheric pressure in said reservoir to cause a flow thereinto of materials through said conduit, a discharge means open to the reservoir below the area of communication between the conduit and reservoir to receive and discharge materials flowed into the reservoir, the vacuum line having a second branch communicating with a portion of said discharge means and operable without interruption to continuously pull a vacuum in said portion of the discharge means, and means to maintain a generally balanced introduction of materials into the reservoir and discharge therefrom comprising a control valve in the first branch of the vacuum line, a vertically movable actuating element responding to the elevation of materials in the reservoir, and means operatively interconnecting the valve and the actuating element whereby the valve moves toward closed position to reduce vacuum pull through the line as the first branch of the actuating element rises and moves toward open position to increase vacuum pull through that branch as the actuating element descends.

References Cited by the Examiner
UNITED STATES PATENTS

| | | | |
|---|---|---|---|
| 2,071,703 | 2/1937 | Nelson et al. | |
| 2,666,671 | 1/1954 | Kimmerle | 302—14 |
| 2,736,121 | 2/1956 | Kimmerle | 302—14 |

ANDRES H. NIELSEN, *Primary Examiner.*